Patented Apr. 18, 1933

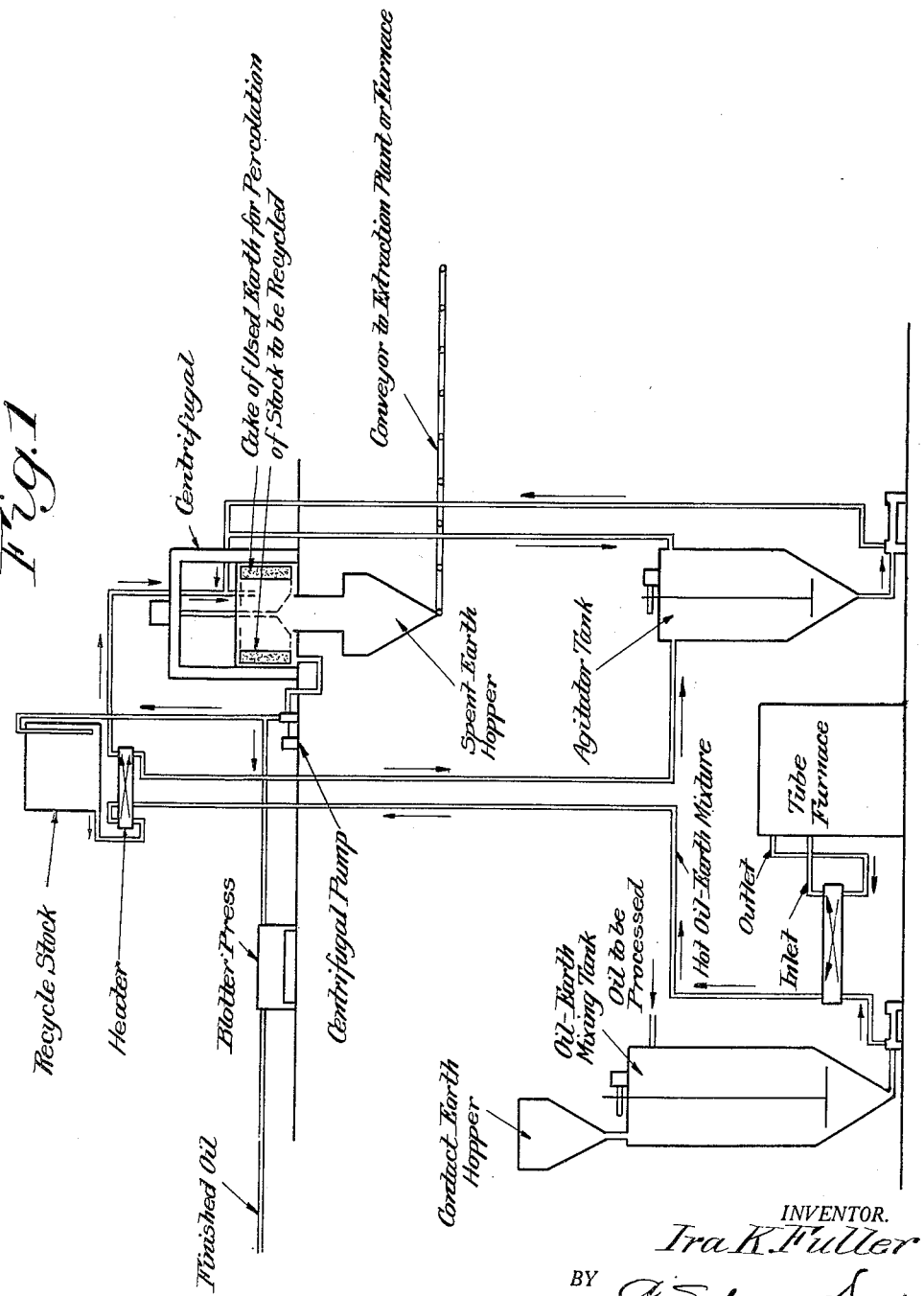

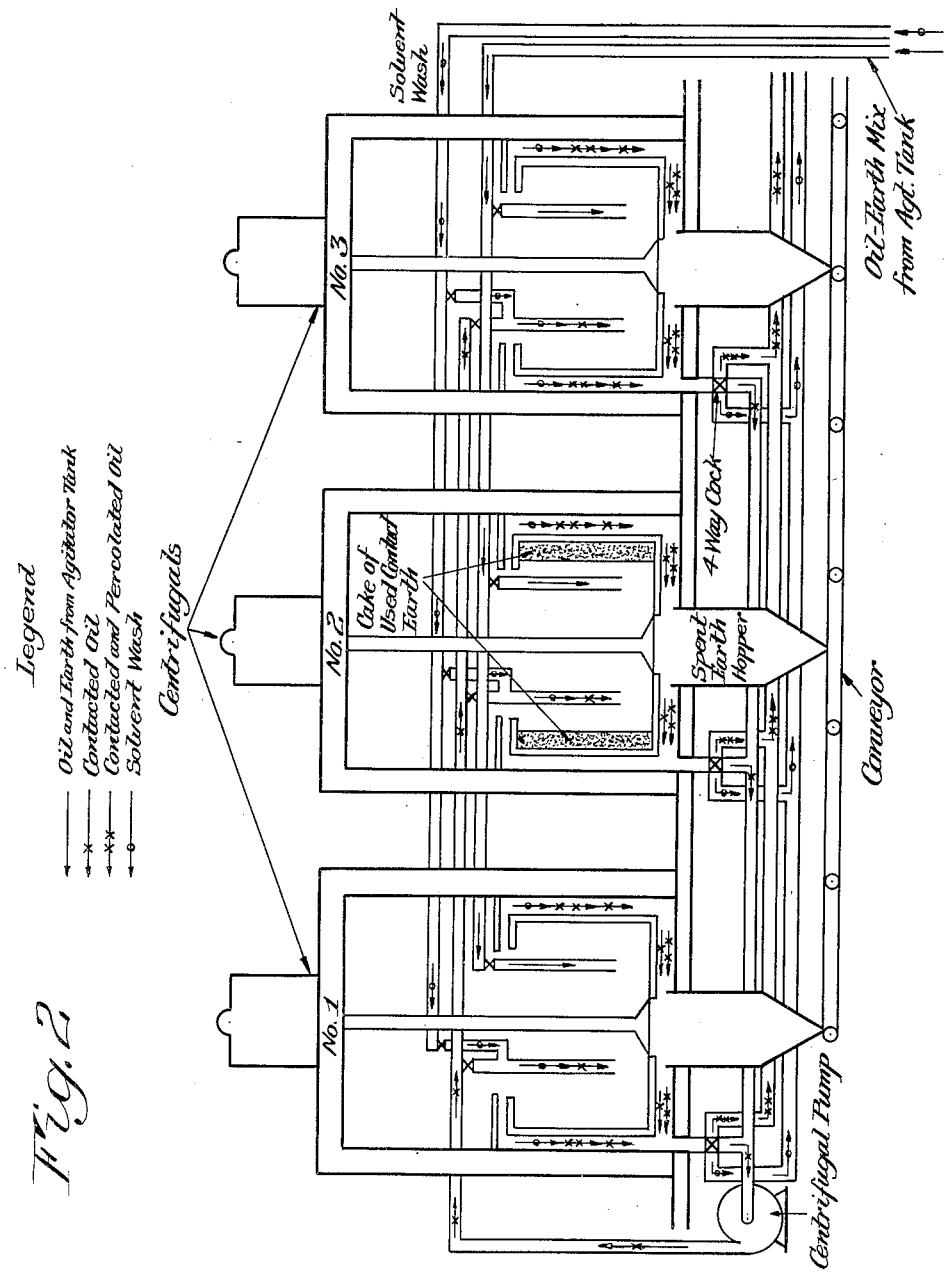

1,904,682

UNITED STATES PATENT OFFICE

IRA K. FULLER, OF OLEAN, NEW YORK, ASSIGNOR, BY MESNE ASSIGNMENTS, TO CONTACT FILTRATION COMPANY, A CORPORATION OF CALIFORNIA

PROCESS FOR DECOLORIZING OILS

Application filed September 28, 1929. Serial No. 395,788.

The present invention embodies improvements in decolorizing mineral oils through treatment with adsorbents.

It is well known that certain "activated" materials, especially clay-like substances, have the property of decolorizing oils when the adsorbent is contacted with the oil under proper conditions. The kinds of materials suitable for use as adsorbents are well known, and it will be understood that the term "clay", as herein used, refers generically to these adsorbent materials.

Mineral oil may be decolorized either by mixing or "contacting" the oil and clay or by percolating the oil through a bed of the clay. In the first of these methods of treatment, it is customary to heat the oil-clay mixture to a suitable temperature for a period of time favoring the decolorization, the operating conditions being dependent upon the kind of oil stock and clay, and being determined in practice by trial. The mixture of oil and clay, cooled sufficiently to prevent oxidation of the oil, is then fed to a filter-press, where the clay is collected as a cake, and the oil, now decolorized, passes to a blotter press, where the last traces of clay are removed, and then to storage. Before the oil is ready for marketing, it is necessary to dewax it.

In accordance with the percolation procedure, the stock, which may have been previously dewaxed, is brought to the proper viscosity for percolation by heating, or by the addition of a diluent. However, the percolation process is carried out at considerably lower temperatures than the contacting process.

The present invention, is based upon the discovery that clay from the contacting operation still possesses adsorbent properties which may be utilized in a percolation process.

In accordance with standard practice, the cake remaining in the filter-press must be extracted and reactivated for reuse owing to the high cost of adsorbent clay. As above pointed out, this cake constitutes the clay from a contacting operation, and, accordingly, it will contain residual oil, together with gums, and other resinous materials extracted from the oil during the contacting. It has heretofore been thought that the spent clay is useless for further treatment of the oil until after it has been reactivated, since it will no longer effect efficient decolorizing of oil when contacted therewith. It has now been found, however, that the contacting operation does not exhaust completely the adsorptive power of the clay, but that the clay still may be utilized in a percolation stage, thereby effecting a saving in the amount of clay required for a given quantity of oil, and also reducing the frequency of the reactivating operation.

Apparatus for carrying out the present process is shown in the accompanying drawing.

The drawing is a diagrammatic flow sheet of the entire apparatus.

Referring to the drawing, starting with the mixing tank, there is found the usual contact apparatus. Oil to be contacted and clay are placed in the tank and agitated to obtain uniform distribution of clay in the oil. The ratio of the material mixed with the oil to the oil depends on the color of the original oil and the final color desired, as well as the adsorptive power of the clay. For instance, 20% of clay by weight of the oil is often found to be an effective amount. The temperature of the oil and clay during mixing is such that uniformity is readily obtained. In the case of a cylinder oil, about 140° F. is usually found to suffice.

The mixture of oil and clay is passed to a heater, by way of a heat exchanger, which preheats the incoming oil through thermal contact with the heated oil-clay mixture issuing from the heater. This heater may be a tube still, or any other type of continuous heater, in which the mixture of oil and clay is constantly agitated during the heating. The oil-clay mixture is heated to the point where decolorization occurs, this temperature being dependent upon the kind of stock and clay, determined by trial. For certain cylinder stock, 750° F. has been found to be the correct temperature. However, this temperature may vary according to the clay used, as well as the physical characteristics of the oil being processed.

The hot oil-clay mixture leaving the heater passes through the heat exchanger in thermal contact with the incoming mixture, and it is thereby cooled to a temperature safe to handle. The mixture is cooled to say 350° F. in the heat exchanger, or a higher temperature may be desirable if the mixture is to be used in the later heat exchange, as indicated in the drawing. After passing the heat exchanger, the mixture enters an agitator tank. This tank, equipped with agitation of some type to keep the medium in suspension, acts as a "cushion" in the process, taking care of varying flow through different units in the process.

From the agitator tank, the oil-clay mixture is pumped preferably to a centrifugal. Any device which will effect the separation of the clay from the contacted oil may be used which forms the separated, used, contact clay in an appreciably thick cake. An ordinary plate and frame filter-press can be employed. The oil-clay mixture at this point should have a temperature which permits easy flow of the oil through the cake. For cylinder stocks, 200–250° F. may be found suitable.

On entering the centrifugal, equipped with a perforated basket, the mixture is thrown away from the center, the oil passing through the filter medium used, to the outside and out of the bottom. The used clay forms a cake in the basket, the thickness of which may be allowed to increase to about four inches. Thus the first oil through the cake is true contacted oil. As the cake builds up, the oil passing through becomes lighter in color due to passing through the layer of used clay. For example, the first oil through may be 300° Lovibond color and the last 150° Lovibond. The contacted oil as discharged from the centrifugal is pumped to a recycle tank. This tank is arranged so that there is a minimum agitation so as not to mix the dark oil and the light oil. By discharging into the tank near the bottom, the tendency would be for the dark or first oil to be on the top and the last or light oil to be on the bottom. Thus at the completion of the centrifugal run, there would be in the basket a layer or cake of used clay, and in the recycle tank the contacted oil, which, as above mentioned, is in layers, dark at the top and light in color at the bottom. A tank extremely small in diameter for its height accomplishes the segregation into layers.

When it is removed from the recycle tank, the oil is taken out in reverse order to its entering, that is, the light oil is taken from the tank first, and the dark colored oil last. It passes through a heat exchanger to make up for any loss in temperature, if necessary, back to the centrifugal where it is percolated through the layers of used clay from which the oil was previously separated. In passing through this cake more color is removed. Thus there is obtained from the bottom of the centrifugal a still lighter colored oil, which, after passing through a blotter press, is run to storage. If full power of the used clay is not obtained the first time, it may be necessary to again run the oil to the recycle tank and again through the cake.

When the cake is fully spent, it is discharged to a hopper and conveyed to an extraction plant, or solvent naphtha or gasoline may be circulated through it before dumping, by suitable connections, to remove the remaining oil content. The washed cake may be conveyed to a dryer, if found necessary, and then to a reactivating furnace.

While the process is described and illustrated as being used in connection with centrifugals, it will be clear that filter-presses of suitable construction may be substituted for the centrifugals.

The method is of advantage in that it permits decolorization at lower temperatures than has been employed up to the present time, thus avoiding cracking the oil stock and resultant loss of flash. This applies particularly to cylinder stocks when a temperature above 500° F. is used.

What I claim as my invention and desire to secure by Letters Patent is:

A process for decolorizing oil, which comprises contacting the oil with adsorbent clay, separating the clay from the oil in a bed, while passing the oil through the bed of clay as the said bed forms, thereby progressively decolorizing the oil from dark to substantially lighter color, collecting the said oil in a plurality of superposed layers, progressively darkening in color from the lightest color on the bottom to the darkest on top, and recirculating the said oil through the bed of clay, progressively from the lightest colored oil to the darkest, thereby further decolorizing the oil and producing a uniform product of desired color.

IRA K. FULLER.